(12) United States Patent
Umesh et al.

(10) Patent No.: US 11,087,766 B2
(45) Date of Patent: Aug. 10, 2021

(54) SYSTEM AND METHOD FOR DYNAMIC SPEECH RECOGNITION SELECTION BASED ON SPEECH RATE OR BUSINESS DOMAIN

(71) Applicant: Uniphore Software Systems, Chennai (IN)

(72) Inventors: Sachdev Umesh, New Delhi (IN); Pattabhiraman Thiyagarajasarma, Redmond, WA (US); Gopalakrishnan Gururaghavendran, Chennai (IN)

(73) Assignee: Uniphore Software Systems, Chennai (IN)

( * ) Notice: Subject to any disclaimer, the term of this patent is extended or adjusted under 35 U.S.C. 154(b) by 70 days.

(21) Appl. No.: 15/915,181

(22) Filed: Mar. 8, 2018

(65) Prior Publication Data
US 2019/0214017 A1    Jul. 11, 2019

(30) Foreign Application Priority Data
Jan. 5, 2018   (IN) .............................. 201841000521

(51) Int. Cl.
| | |
|---|---|
| *G10L 15/32* | (2013.01) |
| *G10L 15/04* | (2013.01) |
| *G10L 15/08* | (2006.01) |
| *G10L 15/26* | (2006.01) |
| *G10L 15/22* | (2006.01) |
| *G10L 25/84* | (2013.01) |
| *G10L 15/06* | (2013.01) |

(52) U.S. Cl.
CPC .............. *G10L 15/32* (2013.01); *G10L 15/04* (2013.01); *G10L 15/063* (2013.01); *G10L 15/22* (2013.01); *G10L 25/84* (2013.01); *G10L 15/26* (2013.01)

(58) Field of Classification Search
CPC ....... G10L 15/005; G10L 15/05; G10L 15/07; G10L 15/22; G10L 15/32; G10L 15/26
USPC .............................. 704/236, 253, 270.1, 235
See application file for complete search history.

(56) References Cited

U.S. PATENT DOCUMENTS

| | | | | |
|---|---|---|---|---|
| 6,088,669 | A * | 7/2000 | Maes ...................... | G10L 17/00 704/231 |
| 8,600,746 | B1 * | 12/2013 | Lei .......................... | G10L 15/22 704/235 |
| 8,606,581 | B1 * | 12/2013 | Quast ..................... | G10L 15/32 704/254 |
| 8,909,532 | B2 * | 12/2014 | Cross, Jr. ................ | G10L 15/22 704/231 |
| 2003/0120486 | A1 * | 6/2003 | Brittan .................... | G10L 15/32 704/231 |
| 2005/0038655 | A1 * | 2/2005 | Mutel .................... | G10L 15/144 704/256 |
| 2006/0074671 | A1 * | 4/2006 | Farmaner .............. | G10L 15/193 704/257 |

(Continued)

*Primary Examiner* — Farzad Kazeminezhad
(74) *Attorney, Agent, or Firm* — BakerHostetler

(57) ABSTRACT

A dynamic speech processing system and method is provided. The system includes a receiver configured to receive a plurality of audio files. The audio files include sample training audio files and run-time audio files. The system further includes a speech processor coupled to the receiver and configured to compute a variable value for a specific audio file. The speech processor is configured to dynamically select a set of relevant speech recognition engines for a specific run-time audio file based on the variable value.

20 Claims, 5 Drawing Sheets

(56) References Cited

U.S. PATENT DOCUMENTS

| | | | | |
|---|---|---|---|---|
| 2006/0080105 A1* | 4/2006 | Lee | G10L 15/30 | 704/270.1 |
| 2006/0173684 A1* | 8/2006 | Fischer | G10L 15/20 | 704/254 |
| 2007/0118374 A1* | 5/2007 | Wise | G10L 15/26 | 704/235 |
| 2008/0082332 A1* | 4/2008 | Mallett | G10L 15/07 | 704/250 |
| 2009/0106028 A1* | 4/2009 | Dhanakshirur | G10L 15/20 | 704/270.1 |
| 2010/0185447 A1* | 7/2010 | Krumel | G10L 15/32 | 704/255 |
| 2011/0295603 A1* | 12/2011 | Meisel | G10L 15/07 | 704/246 |
| 2012/0109649 A1* | 5/2012 | Talwar | G10L 15/005 | 704/236 |
| 2012/0179469 A1* | 7/2012 | Newman | G10L 15/30 | 704/270 |
| 2012/0215539 A1* | 8/2012 | Juneja | G10L 15/30 | 704/254 |
| 2012/0259627 A1* | 10/2012 | Willett | G10L 15/183 | 704/231 |
| 2013/0080167 A1* | 3/2013 | Mozer | G10L 15/22 | 704/246 |
| 2013/0080171 A1* | 3/2013 | Mozer | G10L 15/22 | 704/251 |
| 2013/0238336 A1* | 9/2013 | Sung | G10L 15/32 | 704/255 |
| 2014/0088961 A1* | 3/2014 | Woodward | G10L 15/22 | 704/235 |
| 2014/0088964 A1* | 3/2014 | Bellegarda | G10L 15/063 | 704/243 |
| 2014/0337032 A1* | 11/2014 | Aleksic | G10L 15/32 | 704/257 |
| 2015/0032453 A1* | 1/2015 | Hoarty | G10L 15/22 | 704/254 |
| 2015/0057994 A1* | 2/2015 | Fang | G09B 5/125 | 704/4 |
| 2016/0284349 A1* | 9/2016 | Ravindran | G10L 15/20 | |
| 2017/0286407 A1* | 10/2017 | Chochowski | G06F 17/289 | |
| 2018/0047387 A1* | 2/2018 | Nir | G10L 15/05 | |
| 2018/0096678 A1* | 4/2018 | Zhou | G10L 15/32 | |
| 2018/0197545 A1* | 7/2018 | Willett | G10L 15/30 | |

* cited by examiner

SYSTEM AND METHOD FOR DYNAMIC SPEECH RECOGNITION SELECTION BASED ON SPEECH RATE OR BUSINESS DOMAIN

PRIORITY STATEMENT

The present application hereby claims priority under 35 U.S.C. § 119 to Indian patent application number 201841000521 filed 5 Jan. 2018, the entire contents of which are hereby incorporated herein by reference.

FIELD

Embodiments of the invention relate generally to speech processing systems and more particularly to a system and method for dynamic selection of speech recognition engines.

BACKGROUND

Speech is the most natural and easiest way for humans to communicate and relay information. However, recognizing and understanding speech is an extremely complex task. Speech recognition technology has been an active research field and has made remarkable progress from a simple and limited single word recognizer systems to much more complex and effective systems which are able to recognize continuous spontaneous speech.

Automatic speech recognition (ASR) technologies have been integrated into speech processing systems using very large, speech models to transcribe speech into text more effectively. However, the performance of automatic speech recognition applications varies widely across different contexts. For example, different ASR engines are trained with different sets of data as per a desired market segment, associated problems and in related languages. This limits the capability of the same engines across a wide variety of scenarios, industries and languages.

Automatic speech recognition is being used in a variety of assistive contexts, including home computer systems, mobile telephones, and various public and private telephony services. In the domain of spontaneous conversational speech number of challenges are posed, such as the presence of speech disfluency, a mix of speech and non-speech sounds, and extreme variation in pronunciation. Various other factors such as language, accents, speech type, numbers, rate of speech, noise level, business domain types and the like, affect the performance and accuracy of such recognition applications.

In other words, large systems and applications that utilize ASR engines are highly challenged to recognize accurately and consistently, various speech patterns and utterances. A virtual assistant, for example, may be required to recognize and decipher between an inordinate number of different dialects, accents, utterances, tones, voice commands, and even noise patterns, just to name a few examples. Poor speech recognition may in turn lead to poor transcription and therefore more processing errors.

Thus, there is a need for a system and method which can accurately and effectively recognize various speech patterns that may be in different languages and applicable across various markets.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a dynamic speech processing system.

Briefly, according to an example embodiment, a dynamic speech processing system is provided. The system includes a receiver configured to receive a plurality of audio files. The audio files include sample training audio files and run-time audio files. The system further includes a speech processor coupled to the receiver and configured to compute a variable value for a specific run-time audio file. The speech processor is configured to dynamically select a set of relevant speech recognition engines for a specific run-time audio file based on the variable value. The set of relevant speech recognition engines is a subset of a set of available speech recognition engines.

According to another example embodiment, a method for dynamic selection of an automated speech recognition engine is provided. The method includes receiving a plurality of audio files. The audio files include sample training audio files and run-time audio files. The method further includes computing a variable value for a specific run-time audio file and dynamically selecting a set of relevant speech recognition engines for a specific run-time audio file based on the variable value.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
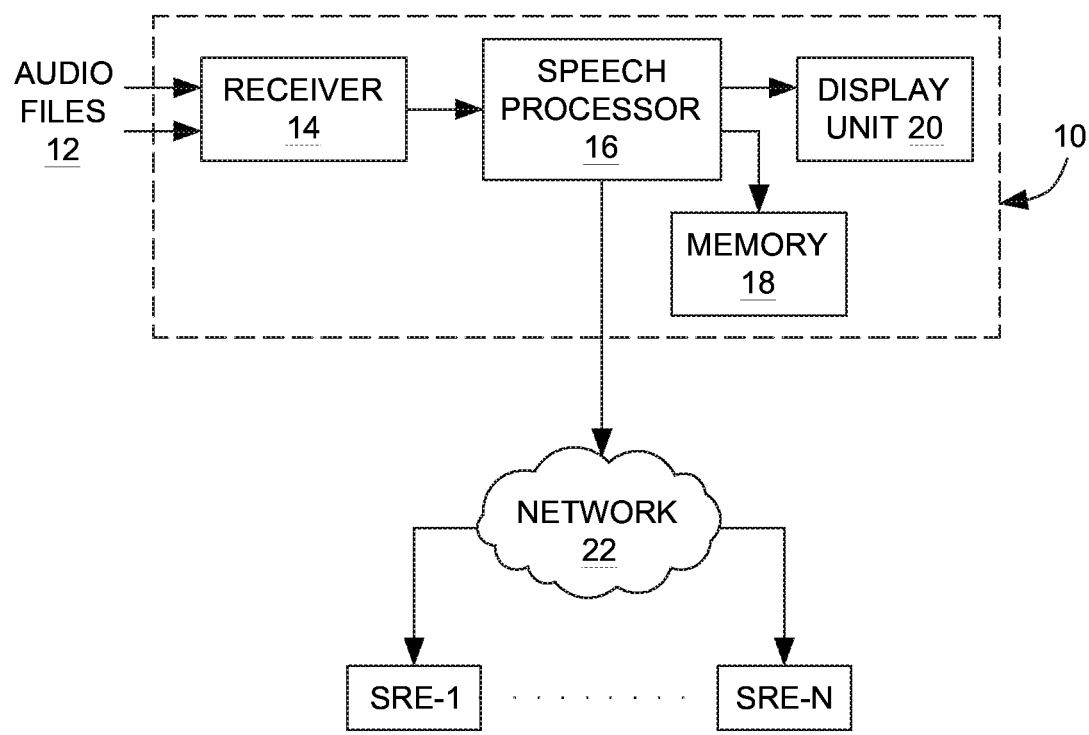
FIG. 1 is a block diagram of one embodiment of a dynamic speech processing system, implemented according to the aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled". Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The systems described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

At least one example embodiment is generally directed to a system for processing an audio file for automatic speech recognition. Example embodiments of the present technique provide a system and method for processing an audio file using a dynamic selection of speech recognition engines.

FIG. 1 is a block diagram of one embodiment of a dynamic speech processing system, implemented according to the aspects of the present technique. The system 10 includes a receiver 14, a speech processor 16, a memory 18 and a display unit 20. Further, several speech recognition engines, SRE-1 through SRE-N are accessible by the dynamic speech processing system 10 through network 22. Each component is described in further detail below.

Receiver 14 is configured to receive audio files 12. Audio files may be run-time audio files or sample training audio files and may include example audio clippings in various languages, accents, pertaining to various business domains, etc. In an embodiment, the sample training audio file may be acquired from a live interaction voice bot or a recorded audio file. Similarly, run-time audio files include real-time conversation exchanges occurring between two entities on an interactive platform such as customer care portals, telephonic interactions, etc.

Speech processor 16 is configured to dynamically select a set of relevant speech recognition engines for a corresponding run-time audio file. It may be noted that the set of relevant speech recognition engines may be a subset of a set of available speech recognition engines. In one embodiment, the speech processor 16 selects the relevant speech recognition engine (SRE) using an accuracy map. The accuracy map is generated by training the speech processor 16 using multiple sample training audio files. Further, the speech processor 16 is configured to generate a transcribed file corresponding to the run-time audio file, using the selected set of speech recognition engines.

Memory 18 is configured to store the audio files 12 including run-time audio files and sample training audio files. Memory 18 is also configured to store influencing variables, variable values and metadata related to the audio files 12. Further, the memory 18 is also configured to store the text files transcribed by the speech processor 16 using the selected set of speech recognition engines and its associated accuracy index. Display unit 20 is configured to display the transcribed text file. In an embodiment, display unit may be a computer monitor, LED/LCD display, wireless notice boards, or any other output display screen.

As mentioned above, an accuracy map for the set of relevant speech recognition engines is generated for training the speech processor. The manner in which an accuracy map is generated for each available speech recognition engine is described in further detail below.

Figure 2:
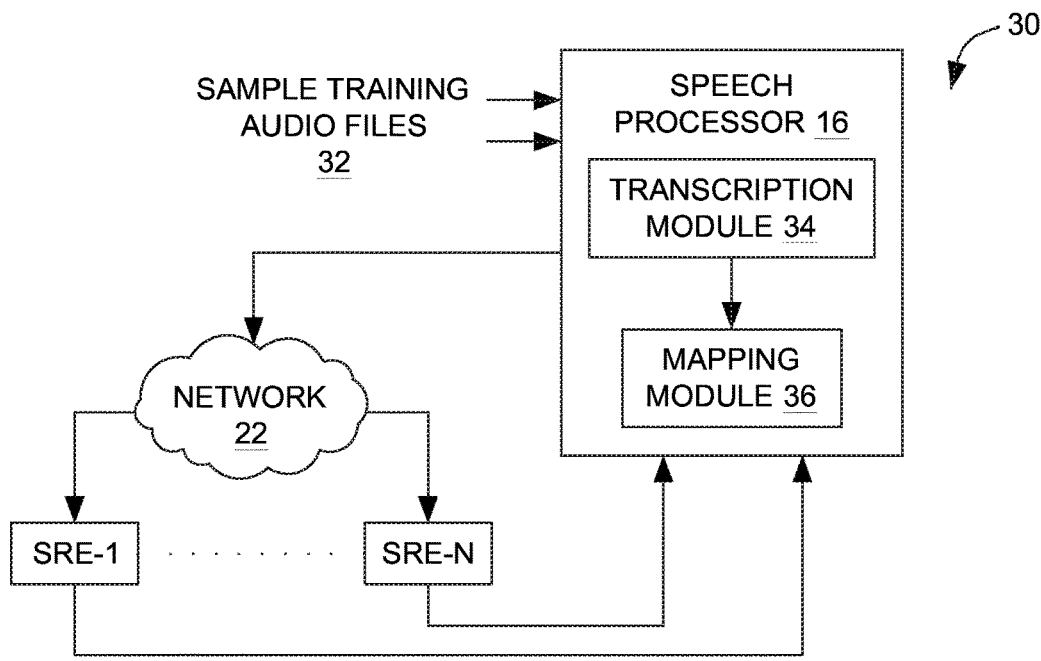
FIG. 2 is a block diagram of an embodiment of a speech processor configured to generate accuracy map, implemented according to the aspects of the present technique.

FIG. 2 is a block diagram of an embodiment of a speech processor configured to generate accuracy map, implemented according to the aspects of the present technique. Speech processor 16 includes a transcription module 34 and a mapping module 36. Further speech processor 16 is configured to access several speech recognition engines SRE-1 through SRE-N through network 22. Each component is described in further detail below.

As described above, speech processor 16 is configured to analyze the sample training audio files 32 to generate an accuracy map for a set of available speech recognition engines, SRE-1 through SRE-N. In an embodiment, the accuracy map is generated by computing an accuracy index for each available speech recognition engine by comparing with a transcription module.

Transcription module 34 is configured to transcribe each sample training audio file into corresponding text files using a standard text transcription model. The sample training audio files are also transcribed using SRE-1 through SRE-N. Mapping module 36 is configured to generate an accuracy map for SRE-1 through SRE-N. In one embodiment, the accuracy map is generated by computing an accuracy index for each available speech recognition engine. In one embodiment, the accuracy index is calculated for each influencing variable.

The accuracy map is used to map various influencing variables to set of relevant speech recognition engines. In other words, the accuracy map is generated to depict the accuracy of set of available speech recognition engines for each influencing variable. In an embodiment, processing of sample training audio files automatically updates the accuracy map. Mapping module 36 is further configured to order/sequence the available speech recognition engines according to the accuracy index. The manner in which each sample training audio file is processed is described in various steps in FIG. 3 below.

Figure 3:
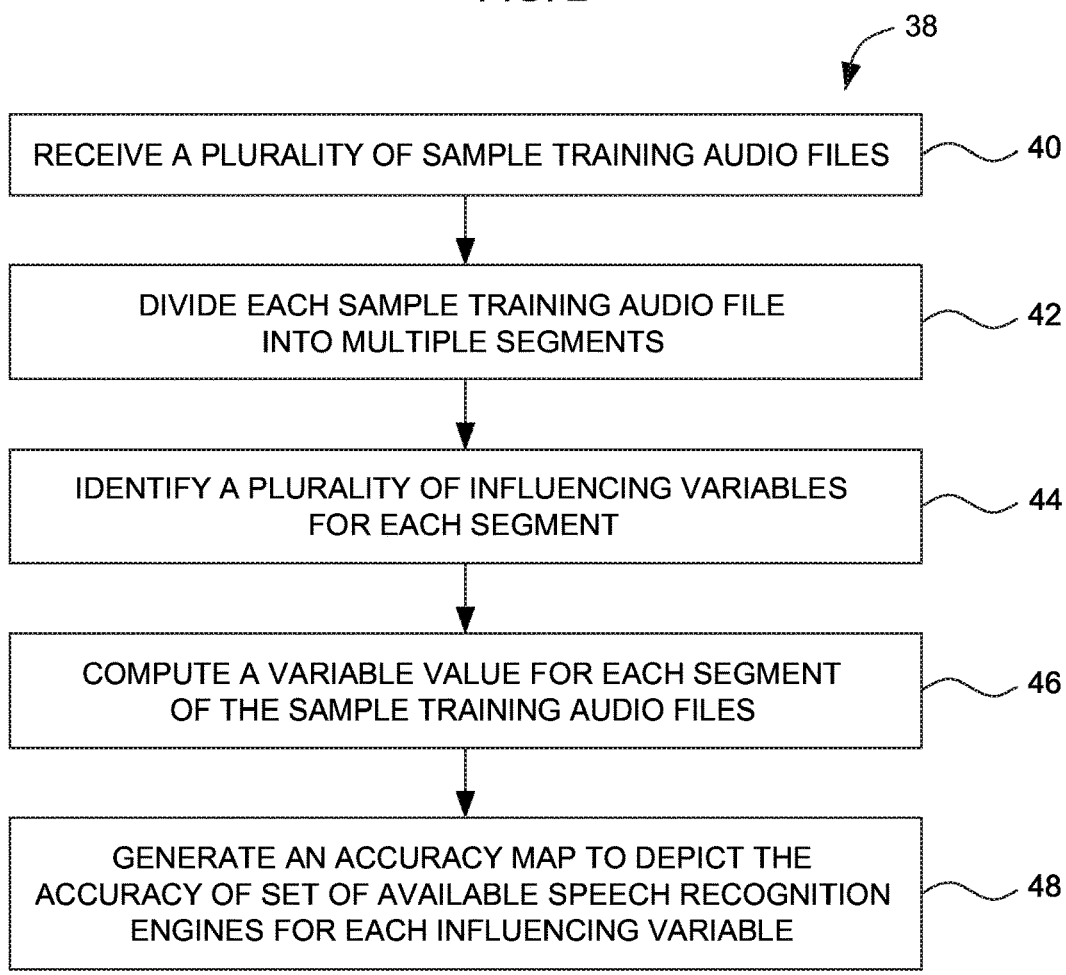
FIG. 3 is a flow diagram illustrating a process for analyzing a sample training audio file, implemented according to the aspects of the present technique.

FIG. 3 is a flow diagram 38 illustrating a process for analyzing a sample training audio file, implemented according to the aspects of the present technique. In one embodiment, the sample training audio files serve as training data for the system. Each step is described in further detail below.

At step 40, a plurality of sample training audio files is received from the receiver 14. In one embodiment, each sample training audio file may be characterized by combination of various influencing variables such as language, accent, business domain, rate of speech, noise level and the like. For example, some sample training audio files may be characterized for language such as Spanish, French, etc., while some may be for specific domain and noise level.

At step 42, each sample training audio file is divided into multiple segments. The sample training audio files are analyzed to determine various influencing variables associated with each segment of each sample training audio file. In an embodiment, each sample training audio file is divided into a number of segments based on one or more attributes such as silent periods, time intervals, noise level and the like. Typically, the segments range from about 0.5 second to 15 seconds or more.

At step 44, a plurality of influencing variables is identified for each segment. Example of influencing variables include language, accent, business domain, context, rate of speech, noise level and the like. For example, in the first segment, language and accent may be identified as an influencing variable. In a subsequent segment business domain and noise level may be identified as influencing variables for that specific segment.

At step 46, a variable value is calculated for each segment of the sample training audio file. In one embodiment, the variable value is calculated based on the influencing variables identified for each segment of the sample training audio file. Further, each sample training audio file is transcribed using SRE-1 through SRE-N.

At step 48, an accuracy map is generated to map for each speech recognition, a corresponding accuracy for a specific influencing variable. In other words, the accuracy map is generated to depict the accuracy of set of available speech recognition engines for each influencing variable. Further, the available speech recognition engines are sequenced according to the accuracy index. In an embodiment, the accuracy map gets automatically updated by processing of sample training audio files.

As described earlier, for run-time audio files, a set of relevant speech recognition engines are selected. The manner in which the selection is performed is described in further detail below.

Figure 4:
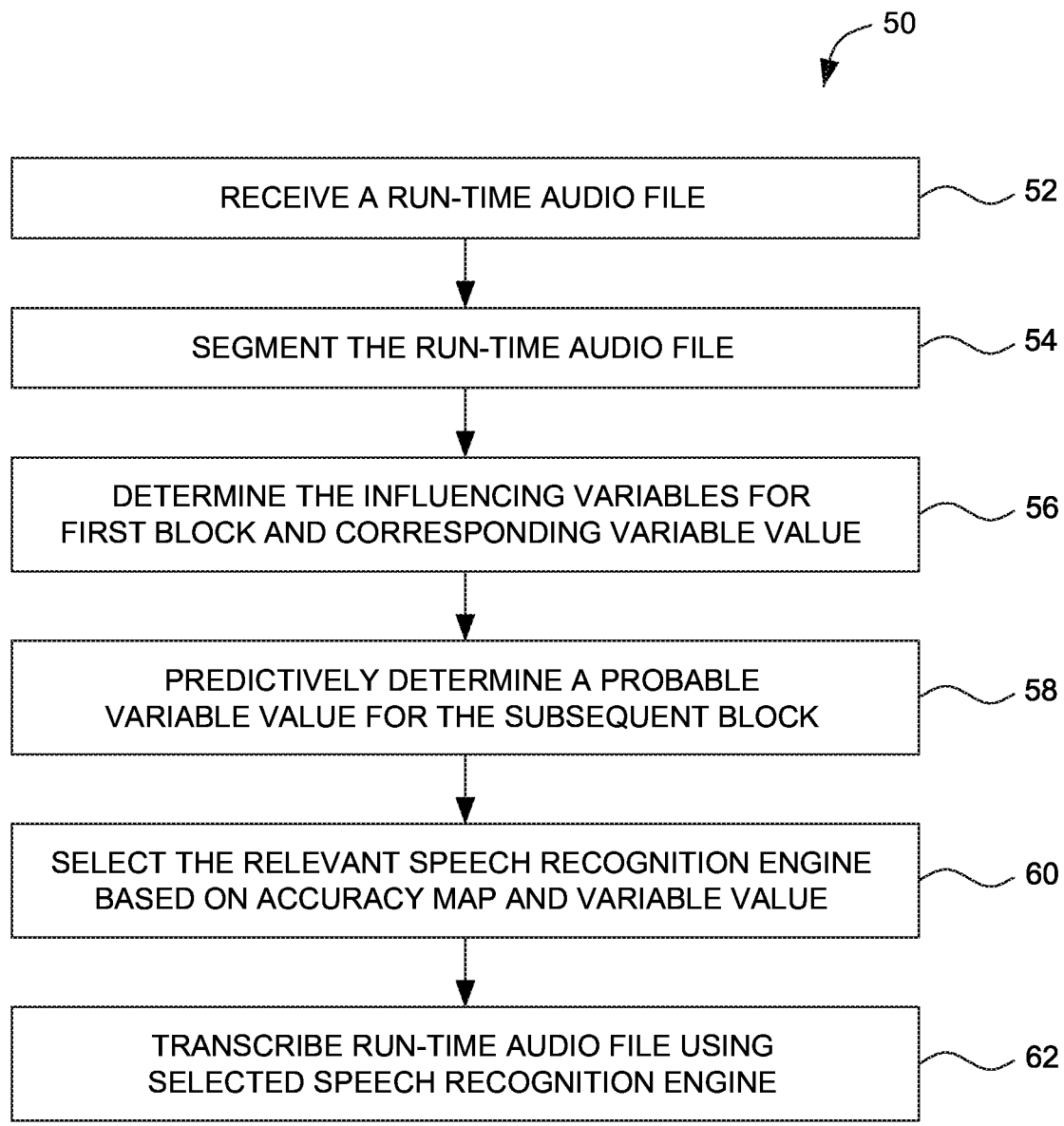
FIG. 4 is a flow diagram illustrating a process for selecting a set of relevant speech recognition engines, implemented according to the aspects of the present technique.

FIG. 4 is a flow diagram 50 illustrating a process for selecting a set of relevant speech recognition engines, implemented according to the aspects of the present technique.

At step 52, a run-time audio file is received. In an embodiment, the run-time audio may be a live interaction voice bot or a recorded audio file. In one embodiment, the run-time audio may be from different business domains, with different languages, accents, rate of speech, noise level and context.

At step 54, the run-time audio file is segmented in to number of blocks. In an embodiment, the run-time audio file is divided based on one or more attributes such as silent periods, time intervals, noise level and the like.

At step 56, the influencing variables are determined for each block in the run-time audio file. In one embodiment, the influencing variables for the first block are determined along with the corresponding variable value. For example, in the first block, language and accent may be identified as influencing variables and their corresponding variable value is determined.

At step 58, a probable variable value for the subsequent blocks are predictively determined. In an embodiment, the probability distribution extracted by sample training audio file and/or metadata is utilized to determine highest probable values of the influencing variables for the next block.

At step 60, the relevant speech recognition engine is selected for the run-time audio file. In an embodiment, the selection is based on the accuracy map and the variable values and influencing variables. In another embodiment, the accuracy map is then used by comparing the accuracy index of the transcribed files obtained from the plurality of relevant speech recognition engines.

Further, available speech recognition engines are sequenced according to the accuracy index and the variable value of each block of the run-time audio file. It may be noted that the accuracy map may be updated also based on accuracy index of the transcribed files generated during run-time audio processing.

At step 62, the run-time audio file is transcribed using a relevant speech recognition engine. In one embodiment, a run-time audio file is transcribed in to a text file using various speech recognition engines selected dynamically at run-time. In this embodiment, for each block of the run-time audio file, a unique speech recognition engine is selected according to the variable value of each block and accuracy index of each speech recognition engine.

Figure 5:
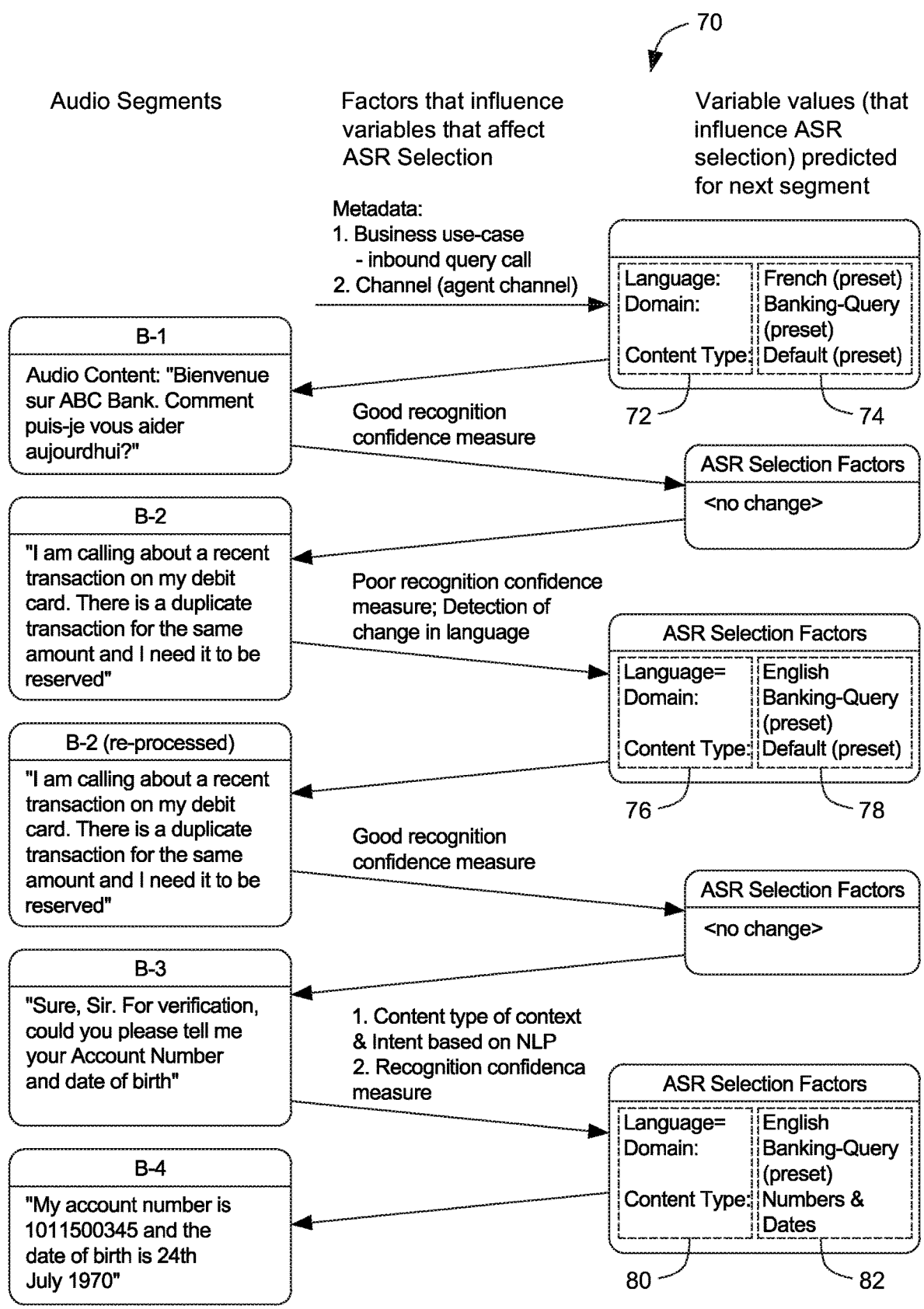
FIG. 5 is an example embodiment illustrating dynamic selection of speech recognition engines for a run-time audio file, implemented according to the aspects of the present technique.

FIG. 5 is an example embodiment 70 illustrating a dynamic selection of speech recognition engines for a run-time audio file, implemented according to the aspects of the present technique. As illustrated in the given embodiment, the run-time audio file is segmented into various blocks, as represented by reference numerals B-1, B-2, B-3 and B-4. In this example, for the first block B-1, the influencing variables (represented by the reference numeral 72) "language", "domain" and "content type" are determined and the corresponding variable values (represented by reference numeral 74) are preset as "French", "Banking query" and "default". A good recognition confidence measure is determined for B-1 and the next block B-2 is assumed to be processed based on the previous block B-1. As illustrated, the influencing variables such as language is changed from the preset language "French" to "English" for block B-2. This results in poor recognition confidence measure. In such case, the block B-2 is reprocessed for relevant speech recognition engine. In this embodiment, the variable value for the influencing variable "language" is determined as "English". For block B-3, a good recognition confidence measure is obtained resulting in no change in the variable value set. Further, for block B-4, while the values for language and the domain remain same as that of previous block B-3, the "content type" value obtained has changed from "default" to "numbers and dates". Thus, a relevant speech recognition engine is selected for each block of the run-time audio file based on the calculated accuracy index of each speech recognition engine and the variable value for each block.

Figure 6:
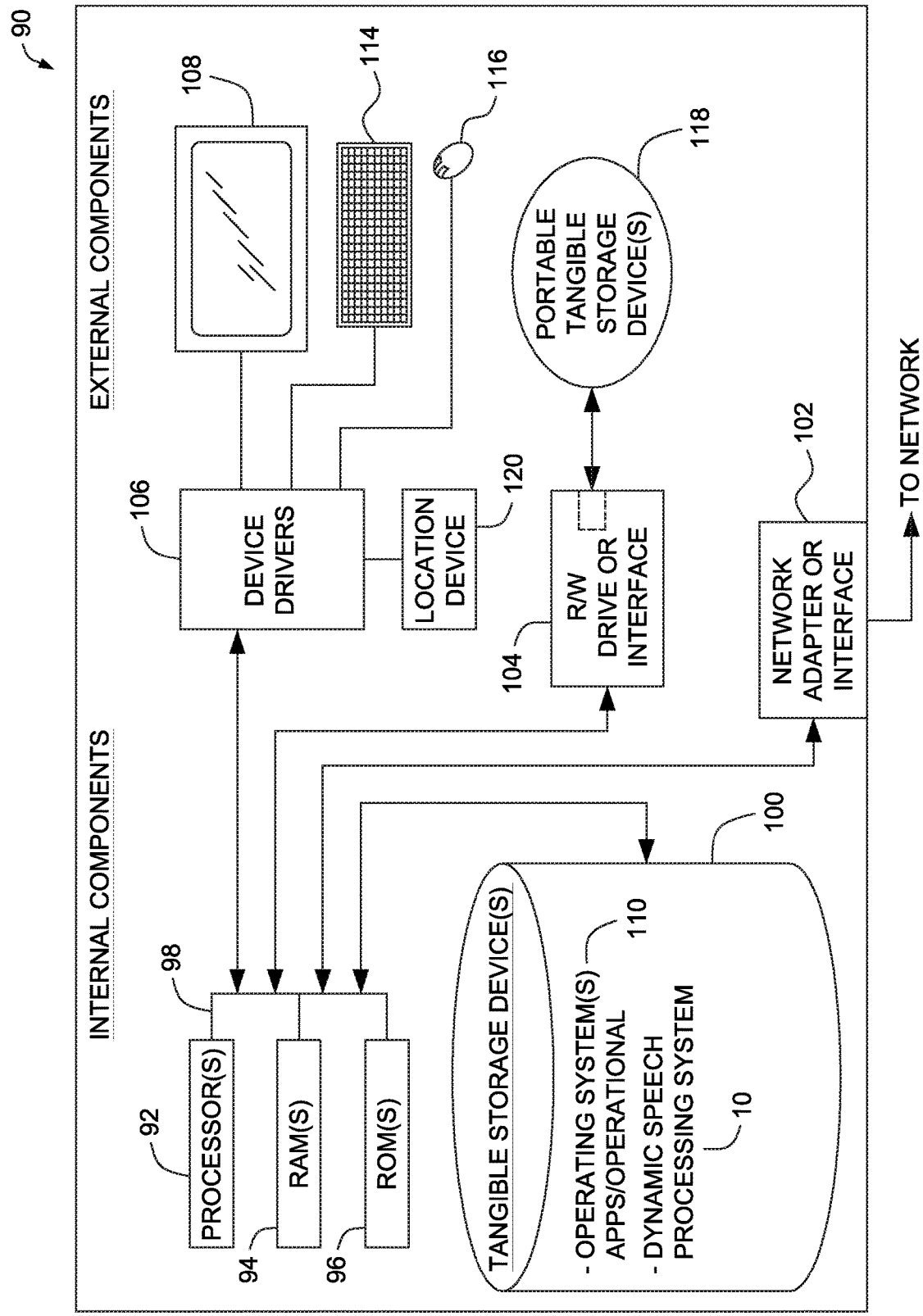
FIG. 6 is a block diagram of an embodiment of a computing device in which the modules of the dynamic speech processing system, described herein, are implemented.

The modules of the dynamic speech processing system 10 described herein are implemented in computing devices. One example of a computing device 90 is described below in FIG. 6. The computing device includes one or more processor 92, one or more computer-readable RAMs 94 and one or more computer-readable ROMs 96 on one or more buses 98. Further, computing device 90 includes a tangible storage device 100 that may be used to execute operating systems 110 and the dynamic speech processing system 10. The various modules of the dynamic speech processing system 10 includes a receiver 14, a speech processor 16, a memory 18 and a display unit 20 may be stored in tangible storage device 100. Both, the operating system 110 and the system 10 are executed by processor 92 via one or more respective RAMs 94 (which typically include cache memory). The execution of the operating system 110 and/or the system 10 by the processor 92, configures the processor 92 as a special purpose processor configured to carry out the functionalities of the operation system 110 and/or the dynamic speech processing system 10, as described above.

Examples of storage devices 100 include semiconductor storage devices such as ROM 96, EPROM, flash memory or any other computer-readable tangible storage device that may store a computer program and digital information.

Computing device also includes a R/W drive or interface 94 to read from and write to one or more portable computer-readable tangible storage devices 108 such as a CD-ROM, DVD, memory stick or semiconductor storage device. Further, network adapters or interfaces 92 such as a TCP/IP adapter cards, wireless Wi-Fi interface cards, or 3G or 4G wireless interface cards or other wired or wireless communication links are also included in computing device.

In one example embodiment, the dynamic speech processing system 10 which includes a receiver 14, a speech processor 16, a memory 18 and a display unit 20, may be stored in tangible storage device 100 and may be downloaded from an external computer via a network (for example, the Internet, a local area network or other, wide area network) and network adapter or interface 102.

Computing device further includes device drivers 106 to interface with input and output devices. The input and output devices may include a computer display monitor 108, a keyboard 114, a keypad, a touch screen, a computer mouse 116, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A system for dynamic selection of speech recognition engines, the system comprising:
   a memory having computer readable instructions stored thereon; and
   at least one processor configured to execute the computer readable instructions to:
   receive a plurality of audio files, the plurality of audio files comprising a plurality of sample training audio files and at least one run-time audio file;
   segment the at least one run-time audio file into a plurality of blocks;
   compute at least one first variable value for a first block of the at least one run-time audio file and at least one second variable value for a subsequent block of the at least one run-time audio file following the first block, wherein the at least one first variable value and the at least one second variable value are at least one of a language, an accent, a business domain, a context, a rate of speech, or a noise level;
   dynamically select, based on the at least one first variable value, a first speech recognition engine from among a set of available speech recognition engines for the first block of the plurality of blocks of the at least one run-time audio file;
   process the first block of the plurality of blocks using the first speech recognition engine;
   determine an accuracy measure of the processing of the first block using the first speech recognition engine; and
   dynamically select, based on the at least one second variable value and the accuracy measure of the processing of the first block, a second speech recognition engine from among the set of available speech recognition engines for the subsequent block of the plurality of blocks of the at least one run-time audio file, the second speech recognition engine being different from the first speech recognition engine; and
   transcribe the at least one run-time audio file using the first and second speech recognition engines.

2. The system of claim 1, wherein the at least one processor is configured to compute the at least one first variable value and the at least one second variable value by:
   analyzing the plurality of sample training audio files to determine a plurality of influencing variables associated with each sample training audio file of the plurality of sample training audio files;
   transcribing each sample training audio file of the plurality of sample training audio files into a corresponding text file, the text file generated using a speech recognition engine selected from the set of available speech recognition engines; and
   generating an accuracy map for each speech recognition engine of the set of available speech recognition engines based on the plurality of influencing variables.

3. The system of claim 2, wherein the at least one processor is configured to analyze the plurality of sample training audio files by:
   dividing each sample training audio file into a plurality of sample training audio file segments; and
   determining the plurality of influencing variables for each sample training audio file segment of the plurality of sample training audio file segments.

4. The system of claim 3, wherein the at least one processor is further configured to:
compute a variable value for each sample training audio file based on the plurality of influencing variables for each sample training audio file segment of the corresponding sample training audio file.

5. The system of claim 2, wherein the at least one processor is configured to generate the accuracy map by computing an accuracy index for each available speech recognition engine, the accuracy index based on the transcribed sample training audio file corresponding to each available speech recognition engine.

6. The system of claim 2, wherein the at least one processor is configured to dynamically select the first speech recognition engine based on the at least one first variable value and the accuracy map.

7. The system of claim 1, wherein the at least one processor is configured to dynamically select the second speech recognition engine for the subsequent block of the plurality of blocks by:
selecting a third speech recognition engine from the set of available speech recognition engines based on the accuracy measure of the processing of the first block; and
re-processing the first block using the third speech recognition engine.

8. The system of claim 7, wherein the at least one processor is configured to dynamically select the second speech recognition engine for the subsequent block of the plurality of blocks by:
selecting the third speech recognition engine for the subsequent block based on re-processing of the first block using the third speech recognition engine; and
processing the subsequent block using the third speech recognition engine.

9. The system of claim 1, wherein the at least one processor is configured to segment the at least one run-time audio file into the plurality of blocks based on one or more attributes, wherein the one or more attributes comprise at least one of silent periods, time intervals, noise level, or combinations thereof.

10. The system of claim 1, wherein the at least one first variable value comprises a first language, the at least one second variable value comprises a second language that is different from the first language, the first speech recognition engine corresponds to the first language, and the second speech recognition engine corresponds to the second language.

11. A method for dynamic selection of speech recognition engines, the method comprising:
receiving, using at least one processor, a plurality of audio files, the plurality of audio files comprising a plurality of sample training audio files and at least one run-time audio file;
segmenting the at least one run-time audio file into a plurality of blocks;
computing, using the at least one processor, at least one first variable value for a first block of the at least one run-time audio file and at least one second variable value for a subsequent block of the at least one run-time audio file following the first block, wherein the at least one first variable value and the at least one second variable value are at least one of a language, an accent, a business domain, a context, a rate of speech, or a noise level;
dynamically selecting, using the at least one processor, based on the at least one first variable value, a first speech recognition engine from among a set of available speech recognition engines for the first block of the plurality of blocks of the at least one run-time audio file;
processing, using the at least one processor, the first block of the plurality of blocks using the first speech recognition engine;
determine, using the at least one processor, an accuracy measure of the processing of the first block using the first speech recognition engine; and
dynamically selecting, using the at least one processor, and based on the at least one second variable value and the accuracy measure of the processing of the first block, a second speech recognition engine from among the set of available speech recognition engines for the subsequent block of the plurality of blocks of the at least one run-time audio file, the second speech recognition engine being different from the first speech recognition engine; and
transcribing, using the at least one processor, the at least one run-time audio file using the first and second speech recognition engines.

12. The method of claim 11, wherein the computing the at least one first variable value and the at least one second variable value comprises:
analyzing the plurality of sample training audio files to determine a plurality of influencing variables associated with each sample training audio file of the plurality of sample training audio files;
transcribing each sample training audio file of the plurality of sample training audio files into a corresponding text file, the text file generated using a speech recognition engine selected from the set of available speech recognition engines; and
generating an accuracy map for each speech recognition engine of the set of available speech recognition engines based on the plurality of influencing variables.

13. The method of claim 12, wherein the analyzing the plurality of sample training audio files comprises:
dividing each sample training audio file into a plurality of sample training audio file segments; and
determining the plurality of influencing variables for each sample training audio file segment of the plurality of sample training audio file segments.

14. The method of claim 13, further computing, using the at least one processor, a variable value for each sample training audio file based on the plurality of influencing variables for each sample training audio file segment of the corresponding sample training audio file.

15. The method of claim 12, wherein generating the accuracy map comprises:
computing an accuracy index for each available speech recognition engine, the accuracy index based on the transcribed sample training audio file corresponding to each available speech recognition engine.

16. The method of claim 12, wherein dynamically selecting the first speech recognition engine is based on the at least one first variable value and the accuracy map.

17. The method of claim 11, wherein dynamically selecting the second speech recognition engine for the subsequent block of the plurality of blocks further includes:
selecting a third speech recognition engine from the set of available speech recognition engines based on the accuracy measure of the processing of the first block; and
re-processing the first block using the third speech recognition engine.

18. The method of claim 17, wherein dynamically selecting the second speech recognition engine for the subsequent block of the plurality of blocks further includes:
 selecting the third speech recognition engine for the subsequent block based on re-processing of the first block using the third speech recognition engine; and
 processing the subsequent block using the third speech recognition engine.

19. The method of claim 11, wherein segmenting the at least one run-time audio file into the plurality of blocks is based on one or more attributes, wherein the one or more attributes comprise at least one of silent periods, time intervals, noise level, or combinations thereof.

20. The method of claim 11, wherein the at least one first variable value comprises a first language, the at least one second variable value comprises a second language that is different from the first language, the first speech recognition engine corresponds to the first language, and the second speech recognition engine corresponds to the second language.

* * * * *